United States Patent
D'Ambrosio et al.

(10) Patent No.: US 7,955,680 B2
(45) Date of Patent: Jun. 7, 2011

(54) TESSELLATING ELEMENTS

(75) Inventors: Peter Carlo D'Ambrosio, Cheltenham (GB); Roy Austin Smith, Cheltenham (GB)

(73) Assignee: Dynamic Geometry Limited, Cheltenham (GB)

( * ) Notice: Subject to any disclaimer, the term of this patent is extended or adjusted under 35 U.S.C. 154(b) by 251 days.

(21) Appl. No.: 12/377,353

(22) PCT Filed: Aug. 15, 2007

(86) PCT No.: PCT/GB2007/003112
§ 371 (c)(1),
(2), (4) Date: Feb. 12, 2009

(87) PCT Pub. No.: WO2008/020204
PCT Pub. Date: Feb. 21, 2008

(65) Prior Publication Data
US 2010/0207948 A1    Aug. 19, 2010

(30) Foreign Application Priority Data

Aug. 15, 2006 (GB) .................................. 0616097.2

(51) Int. Cl.
*B32B 3/14* (2006.01)
(52) U.S. Cl. .......................................... 428/48; 428/44
(58) Field of Classification Search .................. 428/44, 428/48; 404/42, 41; 52/311.2; 434/96; 273/157 R
See application file for complete search history.

(56) References Cited

U.S. PATENT DOCUMENTS

| 3,869,125 A | 3/1975 | Odier |
| 6,305,688 B1 | 10/2001 | Waroway |
| 2004/0191461 A1 | 9/2004 | Riccobene |

FOREIGN PATENT DOCUMENTS

| DE | 2922854 | 12/1980 |
| DE | 29722379 U1 | 4/1998 |
| WO | 8503453 | 8/1985 |
| WO | 0121417 A1 | 3/2001 |

OTHER PUBLICATIONS

Rangel-Mondragon, J. et al. "Computer Generation of Penrose Tilings" Computer Graphics Forum, Mar. 1988, pp. 29-37, vol. 7, No. 1, North-Holland, Amsterdam.

*Primary Examiner* — Alexander Thomas
(74) *Attorney, Agent, or Firm* — Larson & Anderson, LLC

(57) ABSTRACT

The tessellating elements are in sets and comprise (a) at least one curve element comprising a semi-circle of diameter x; (b) at least one wave element having a perimeter which is three-sided, including a first side which is straight and of length x, a second side which comprises a concave curve forming a semi-circle of diameter x, and a third side which comprises a convex curve forming a quarter circle of radius x; (c) at least one corner element having a perimeter which is three-sided, including two sides of length x at right angles to one another and a third side which is concave and comprises a quarter circle of radius x; and, optionally, (d) one or more lozenge elements having at least one shaped face with a perimeter comprising two arcuate edges, each said arcuate edge having a radius of curvature x. The elements have a wide range of applications, from building tiles and children's toys, to screen-filling of computer screens or the like. In use, the elements are laid on a surface in a space-filling manner with straight edges abutting straight edges of adjacent elements, and convex curved edges abutting concave curved edges of adjacent elements.

17 Claims, 6 Drawing Sheets

TESSELLATING ELEMENTS

The present invention concerns sets of tessellating elements and uses therefor, and methods of applying space-filling shapes to surfaces using such sets of tessellating elements.

It has been known for many years that surfaces can be covered by fitting together a series of geometrical elements without gaps or overlaps, to result in a repeating pattern. Such repeating geometrical elements are known as tessellating shapes, and are used to cover surfaces by means of tiles, bricks, blocks, pavoirs, carpets or the like.

It is also known to use tessellating shapes for patterns in children's books, for jigsaws and puzzles, as well as print patterns and elements to fill computer or other screens.

The simplest tessellating shapes, which have been known for centuries, are identical small polygons, such as squares, rectangles, parallelograms, hexagons, triangles or the like. Tessellations of squares, rectangles, parallelogram's and hexagons (but not triangles), can be isohedral, in which all the shapes are congruent, and they are tessellated in the same orientation. Tessellating sets in which all the shapes are the same will be described herein as "first order".

Slightly more advanced is the use of complementary shapes, in which shapes of a second type fill the spatial gaps between shapes of a first type (for example, regular octagons with the spaces defined by abutting octagons filled by squares). Tessellating sets using just two shapes (which are optionally in differing orientations in different areas being filled) will be described herein as "second order".

More complex still are ones in which two or more shapes combine to fill the spatial gaps between shapes of the first type. When there are three shapes, these will be described herein as third order, where there are four shapes, they will be described herein as fourth order, and so on.

It is also known that tessellating shapes not necessarily be polygonal and can, for example, be made by drawing a side of a shape to be the exact complementary match of an opposed side of the shape, the technique being the basis of many of the artworks well known from the designs of M.C. Escher.

Examples of sets of tessellating elements are described in GB patent specification 2306184A1 and US patent specification 2004/0191461-A1.

We have now devised improved sets of tessellating elements, each set comprising (a) at least one element of a first type (hereinafter referred to as a "curve" element) having at least one shaped face with a perimeter which comprises a semi-circle of diameter x;

(b) at least one element of a second type (hereinafter referred to as a "wave" element) having at least one shaped face with a perimeter which is three-sided, including a first side which is straight and of length x, a second side which comprises a concave curve forming a semi-circle of diameter x, and a third side which comprises a convex curve forming a quadrant (quarter circle) of radius x. and (c) at least one element of a third type (hereinafter referred to as a "corner" element) having at least one shaped face with a perimeter which is three-sided, including two sides of length x at right angles to one another and a third side which is a concave curve comprising a quadrant (quarter circle) of radius x.

As will be described in more detail in the following description, such a set of tessellating elements is therefore third order (that is, with elements of the first, second and third types).

As will be apparent, the shaped face of the curve element has the shape of half of a disc, in which the curved disc side can be made to abut concave sides of one or more of the wave elements. Other elements can abut one another as will be described hereafter in more detail. (The word "abut" is used herein to mean to contact along at least part of the extent of a side without overlap or spacing.)

In some embodiments of the invention, there may in addition be provided:

(d) at least one element of a fourth type (hereinafter referred to as a "lozenge" element) having at least one shaped face with a perimeter comprising two arcuate edges, each said arcuate edge having a radius of curvature x. A set of tessellating elements including this element of a fourth type together with elements of the first to third types is therefore fourth order (that is, with elements of all four types).

The precise geometry of the elements used in the set according to the invention is important in order to ensure accurate space filling; the tessellating elements according to the invention are therefore clearly distinguished from the apparently similar shapes disclosed in, for example, DE-A-2922854. FIGS. 6 to 10 of the latter document show a series of square tiles made up of a semicircular element, a second element having a straight side, a concave side (in which a semi-circular element can fit) and a convex side, and a third element having two straight sides and a concave side. However, in the arrangement just described, the diameter of the semi-circular element is significantly less than the length of the straight sides of the second and third elements, with the result that the semicircular elements can not be used to fill space with the diameter of the semicircular elements abutting the whole lengths of sides of either of the second or third elements. The only way in which the elements described could be used to fill space is in the form of squares, as all of FIGS. 6 to 10 of DE-A-2922854 show. The latter has no disclosure or suggestion of separation of the elements from one another and rearranging them, or forming any shape or motif other than a square.

In contrast, the precise geometry of the three or four types of element in the sets according to the invention enables them to be combined in various ways to provide space-filling arrangements (sometimes in the form of motifs consisting of a predetermined number of each type of element). The precise geometry of the elements includes the lengths of the sides, the curvatures of the curved sides and the consequent areas of the elements, all of which features enable the elements to combine in a multiplicity of ways to fill space without gaps between adjacent elements.

In summary, the broadest aspect of the present invention differs from the disclosure of DE-A-2922854 in the following respects:

a—the lengths of the sides of semicircular elements are the same as the straight sides of the other elements, b—the concave and convex sides of the wave taper to zero, c—the areas of the curve element and wave element are identical as will be described subsequently in more detail, and d—the elements are able to fill space in a multiplicity of ways using different combined arrangements of the respective elements (for example, by forming complex "motifs" of predetermined shape, each consisting of a predetermined arrangement of the elements forming a set according to the invention).

In one arrangement, the curve element, the wave element and the corner element may be combined in sets of three (one of each type) so as to together to define a motif in the form of a square of side x, such squares being used in a tessellating arrangement, which comprises a repeating series of such squares. Sets of the curve element, sets of the wave element and sets of the corner element may furthermore be combined together in other ways to form a vast selection of shapes other than squares. The elements are generally combined to produce such shapes with the elements straight edge to straight edge and curved edge to curved edge to produce such shapes.

In other arrangements (to form other space-filling motifs), sides forming the diameter of elements of the first type (curves) may be abutted with the straight sides of elements of the second type (waves) and/or with either of the straight sides of elements of the third type (corners) and/or with sides forming the diameters of further curves. Similarly, straight sides of waves may be abutted with sides forming the diameter of curves, with either of the straight sides of corners, and/or with straight sides of further waves. Furthermore either straight side of the corners may be abutted with sides forming the diameter of curves, with straight sides of waves, and/or with straight sides of further corners.

Furthermore, sides forming the (convex) curved side of the curve elements may be abutted with the concave curved sides of the wave elements, and vice versa, in any suitable relative orientation. The concave curved sides of the corner elements may be abutted with the convex curved sides of the wave elements.

When the elements are combined curved edge to curved edge, there is a large selection of possible relative orientations of abutting edges, and the elements may be rotated relative to one another. When the elements are combined straight edge to straight edge, it is not necessary for corners of adjacent elements to be adjacent to one another.

When the convex side of a curve element is contacted with the concave side of a corner element, there will only be tangential contact, not abutment of matched curved sides. Gaps between such convex sides of curve elements and concave sides of corner elements can be filled according to the invention by appropriately oriented wave elements.

Any of the elements used in a set according to the invention may itself be composed of sub-elements, providing the sub-elements combine to form the correct geometry as defined above. In a particularly preferred embodiment, at least some of the curves may be composed of two quadrants. Such quadrants may be made by combining a sub-element (hereinafter referred to as a "sub-curve" element) having a semicircular face of diameter x/2 together with a further sub-element (hereinafter referred to as a "sub-wave" element) having at least one shaped face with a perimeter which is three-sided, with a straight side of length x/2, a concave side of diameter x/2 and a convex side of radius x/2.

Alternatively, such quadrants may be made by combining a sub-element (hereinafter referred to as a "sub-corner" element) having at least one shaped face with a perimeter which is three-sided, with two straight sides of length x/2 at right angles to one another and a third side which is concave, with a radius of x/2, together with a further sub-element (hereinafter referred to as a "sub-lozenge" element) of radius of curvature x/2.

The present invention therefore further comprises a method of applying space-filling shapes to a surface, which comprises providing a plurality of sets of tessellating elements according to the invention, and laying elements selected from said sets on the surface (either individually or in groups), in such a manner that straight sides forming the diameter of selected elements of the first type (curves), straight sides of selected elements of the second type (waves), and straight sides of selected elements of the third type (corners) are in respective abutment with one another, and convex sides of selected elements of the first type (curves) abut concave sides of selected elements of the second or third type (waves or corners), and convex curved sides of selected elements of the second type (waves) abut concave curved sides of selected elements of the third type (corners).

The space-filling shapes may be applied to a surface as printed indicia, items in the nature of tiles, or as images on for example a computer screen or projection screen.

The elements used to make the space-filling shapes are preferably laid to the surface so as to substantially fill a spatial area, without gaps between adjacent or abutting elements.

In the embodiment in which there are four types of element, two curve elements may combine with a lozenge element to form a square of side x. Such a combination of elements may form part of a space-filling arrangement using a set according to the invention. In this embodiment, there may be provided a combination of appropriate numbers of each of the first to fourth types of element. This is a fourth order tessellating arrangement, and the elements can be combined together to form a vast selection of shapes. Again, the elements are generally combined straight edge to straight edge and curved edge to curved edge to produce such shapes.

In particular, the lozenge is preferably applied such that its (convex) sides abut respective concave sides of corners and/or to concave sides of waves of a larger scale (such as double the scale of the lozenge) . . . .

The wave element used according to the invention is asymmetrical; it may be therefore be provided in alternative left- or right-handed orientations (for example, if the element were to be placed on a hand with the straight side adjacent the wrist, the two arcuate sides would curve to the left in the case of a left-hand orientation, or to the right in the case of a right-hand orientation). It is therefore possible for the elements to be tessellated with the wave element in either left-hand or right-hand orientations; in some embodiments it is desirable to use some with left-hand orientations and others with right-hand orientations.

The curve element used according to the invention is symmetrical—that is, it consists of two equal quarter circles or quadrants and is therefore symmetrical about a line or rotational axis connecting the centre of the circle (the mid-point of the straight side) and a mid-point of the convex semicircular arc. Similarly, the corner element used according to the invention is also symmetrical about a line or rotational axis connecting the right angle to a mid-point of the concave side. Both the curved element and the corner element can therefore be presented in any suitable orientation.

The lozenge element optionally used according to the invention has two axes of symmetry, namely a long axis connecting the two corners and a short axis connecting the mid-points of the two curved sides.

The present invention further comprises a series of tessellating shaped motifs, each such motif being made from a selected number of waves, curves, corners, and lozenges of sets according to the invention and as described herein.

The at least one face of each of the elements mentioned is preferably suitable as an undersurface when the elements have a depth (that is when they are three dimensional) or a visible surface when the elements are strictly planar (that is, they have no or nominal depth). When the elements have a depth, the upper face is, in many embodiments, intended as a visible surface; it is particularly preferred that the undersurface of at least the wave elements is suitable both as an undersurface and as a visible surface.

In this latter embodiment, the wave elements (and optionally one or more of the curve elements, corner elements and lozenge elements) may be "flipped", or rotated about 180 degrees, so that either face can be presented as the visible or upper surface. In this way, a substantially wider variety of tessellating arrangements can be formed from a combination of one or more of each of the curve, wave and corner elements and, when used, one or more of the lozenge elements.

The perimeters of each of the elements are preferably planar, in which case the tessellating elements have at least one flat surface such that tessellation can be achieved on a flat surface. In other embodiments of the invention, the perimeters may be located on the surface of a three-dimensional curved body, such as a sphere or the like. In this case, the tessellation is achieved on the surface of such a three-dimensional curved body.

Examples of planar tessellating elements forming sets according to the invention include shapes intended to be displayed on a screen or projected to form an image. In this case, the elements may be intended to be arranged to form a tessellated arrangement filling at least part of the screen or image, under the control of the user of a games apparatus, a computer or processor or the like.

In the latter case, the tessellating elements may form part of a computer or games apparatus in which the object is to create a screen-filling arrangement of tessellating elements, or to design aesthetically pleasing mosaic-type arrangements.

Alternatively, the elements may be arranged to form a tessellated arrangement under the control of computer software, in which case they may form display icons or screen elements constituting a screen saver display or the like.

In another embodiment of the invention, the tessellating elements may be in the nature of print images intended to be applied to a flat substrate such as a paper or plastics sheet, or the surface of a metal sheet, moulding or other suitable substrate.

In a further embodiment of the invention, the tessellating elements may be generally flat, with a depth which is relatively small compared to the dimension x. In this case, the elements may be in the form of bricks, tiles, pavoirs, playing cards or playing pieces. In practice, when the tessellating elements are for architectural or building purposes (for example, when they are architectural or building bricks or tiles, or pavoirs), there may be some tolerance as is conventional in building elements, and it is then possible to fill any gaps with mortar, grouting or the like.

In yet further embodiments of the invention, the interior of at least some of the tessellating elements may be open (that is, solid only around the perimeter); in this embodiment, the elements may be tessellated together to form an open or grid-like arrangement.

When the tessellating elements are generally flat, it is preferred in some embodiments that at least one face of each element (generally the face which is intended to be displayed—the obverse is intended to be laid on a flat surface or the like) is of a distinctive, substantially uniform colour. In this manner, aesthetically pleasing arrangements of the visible surfaces can be made by making suitable choices of differently surface coloured elements. Alternatively, edges may be of a contrasting colour; in further embodiments, pictorial elements or indicia may be provided on one or more face.

The tessellating elements in the sets according to the invention may be of a material suitable for the purpose for which the elements are intended; for example, when they are intended for building or architectural use, they may be, for example, of ceramic, mineral, glass, concrete, rubber or plastics; when they are intended for use as playthings, toys or educational articles, they may be of plastics, paper, card, wood or the like.

In some embodiments, formations may be provided on or adjacent edges of the elements to enable them to be more securely engaged with one another. For example, the edges may comprise complementary projections and recesses to permit mating of contiguous tessellating elements one to another.

In some embodiments, sets of different scales may be provided; when they are smaller scale, they are typically either half, quarter or eighth scale (or other fraction which is 2 to the power of a negative integer). When they are larger scale, they are typically double, quadruple or octuple scale (or any other multiple which is 2 to the power of a positive integer).

When sets of two different scales are provided, they therefore include (e) at least one further element of a fifth type having a substantially semi-circular perimeter of diameter $2^y$ times x, wherein y is a whole number, (f) at least one further element of a sixth type substantially identical in shape to the elements of the second type, which elements of a sixth type have a substantially straight side of length substantially $2^y$ times x, wherein y is a whole number;

(g) at least one further element of a seventh type having at least one shaped face with a perimeter which is substantially identical in shape to the elements of the third type, which elements of a seventh type have two substantially straight sides of length substantially $2^y$ times x, wherein y is a whole number; and, optionally, (h) one or more further elements of an eighth type having at least one shaped face with a perimeter which is substantially identical in shape to the elements of a fourth type, which elements of a eighth type have two substantially arcuate sides of radius of curvature substantially $2^y$ times x, wherein y is a whole number.

When such sets of different scales are provided, they are again laid as follows:

with straight sides forming the diameter of selected curves, straight sides of selected waves, and straight sides of selected corners in respective abutment with one another;

with convex sides of selected curves abutting concave sides of selected waves or corners;

with convex curved sides of selected waves abutting concave curved sides of selected corners; and with convex curved sides of selected lozenges abutting concave curved sides of corners or with lozenges abutting concave curved sides of waves (in the latter case the lozenges being a fraction of the scale of the waves).

BRIEF DESCRIPTION OF THE DRAWINGS

Exemplary embodiments of the invention will now be described with reference to the accompanying drawings, in which.

Figure 1A:
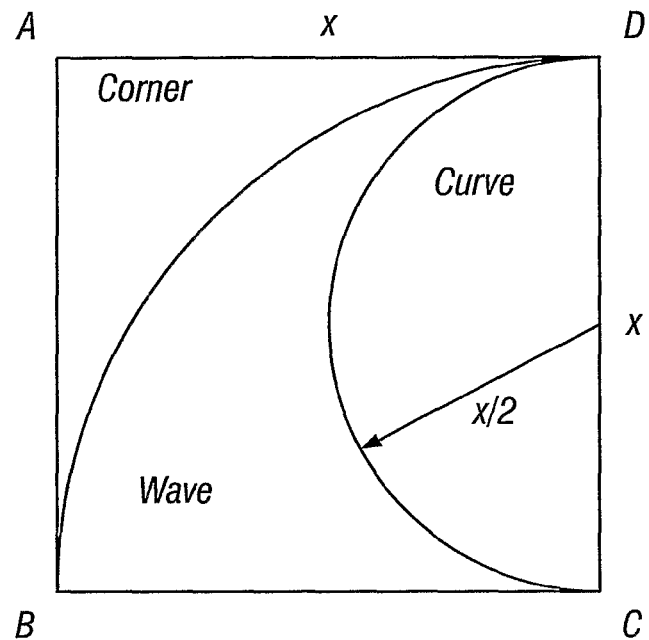
FIGS. 1a and 1b illustrate a set of three elements according to the invention from which a wide range of tessellated patterns can be formed.
Figure 1B:
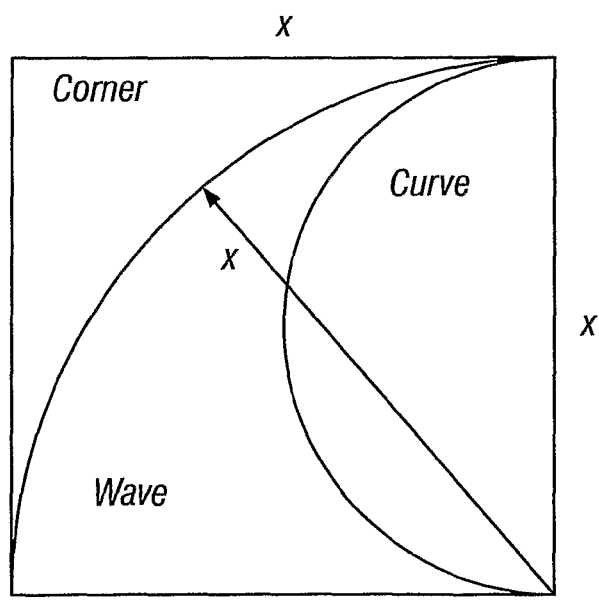

The elements shown in FIGS. 1a and 1b combine to form a square ABCD: the constituent elements of the square are marked as:
Curve;
Wave; and
Corner.

In order for combinations of these elements to tessellate there is a strict relationship between them as follows:
The Curve is a two sided element with one straight side of length x. The curved side is a semi-circle with diameter x (radius of curvature x/2)
The Wave has one straight side of length x, a convex arcuate side of radius x and a concave arcuate side of radius of curvature x/2.
The Corner has two straight sides of length x and one curved concave side whose radius of curvature equals x.

These relationships are essential in order to perform tessellation from the tessellating elements and variants on these elements will not fully tessellate.

Figure 2A:
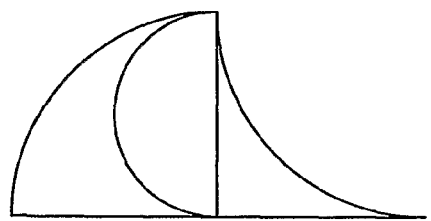
FIGS. 2a to 2h show a wide range of tessellating shapes that can be formed from the elements of FIG. 1.
Figure 2B:
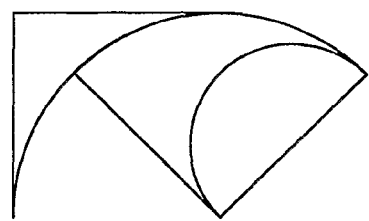
Figure 2C:
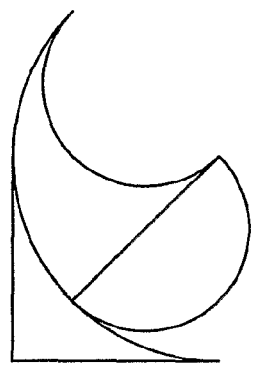
Figure 2D:
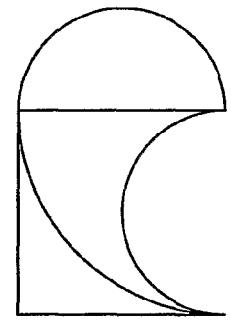
Figure 2E:
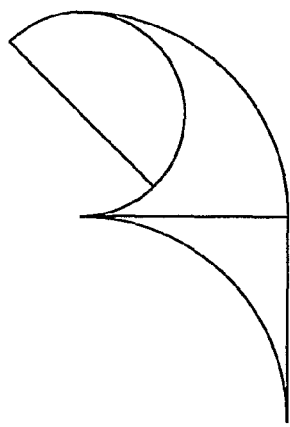
Figure 2F:
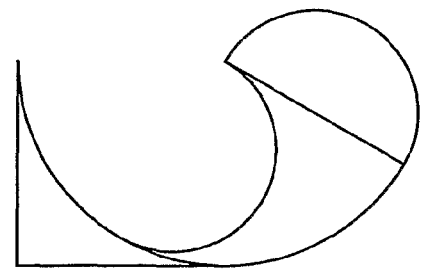
Figure 2G:
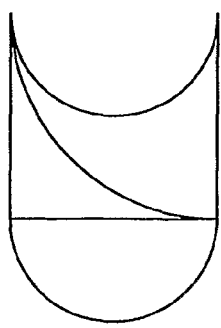
Figure 2H:
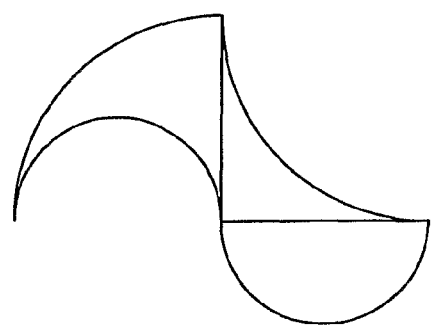
Figure 3A:
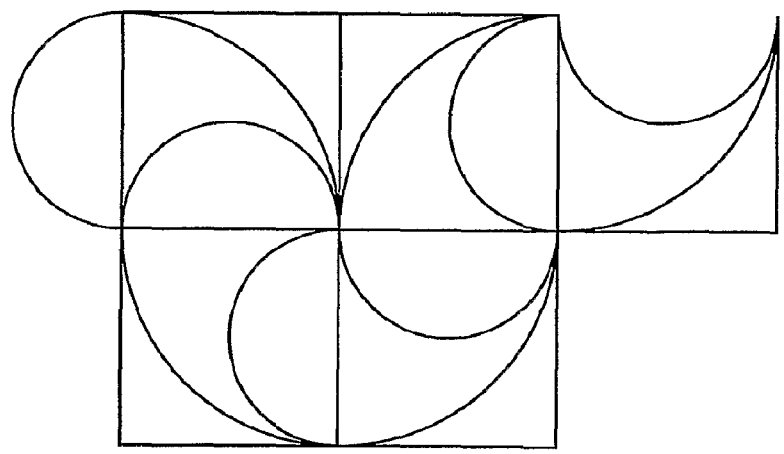
FIGS. 3a to 3b show how basic tessellating shapes, formed from the elements illustrated in FIG. 1, can be combined with others of the same shape to fill space in a third order tessellating arrangement.
Figure 3B:
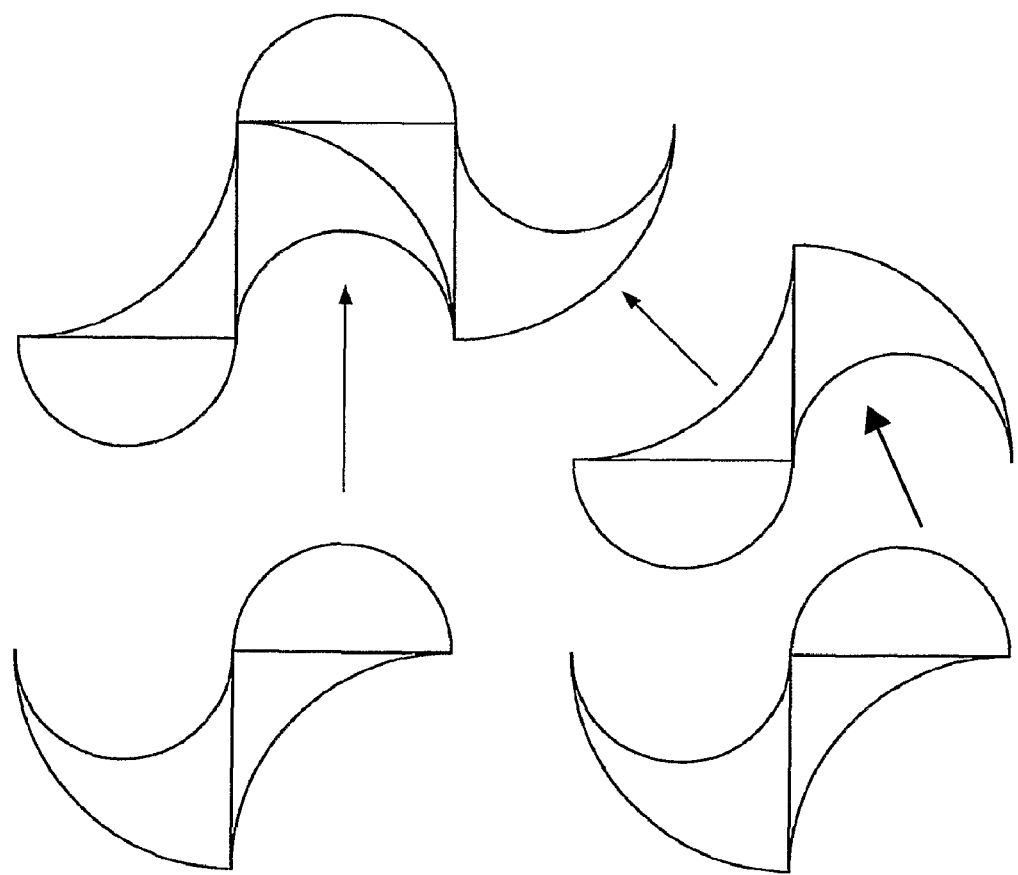

The elements shown in FIG. 1 can be combined in arrangements other than square, by abutting straight edges and curved edges of selected elements; several examples are shown in FIGS. 2a to 2f. The combined shapes illustrated in FIGS. 2a to 2f illustrate how matching radii of curved surfaces can slide over one another creating gaps that can be filled with segments of other elements FIG. 3a shows a shape produced by combining the curve, wave and corner (in the orientation shown in FIG. 2d) can be used in a tessellating arrangement. FIG. 3b shows a shape produced by combining the curve, wave and corner (similar to that of FIG. 2h, but with the wave flipped) can be used in a tessellating arrangement.

Figure 4:
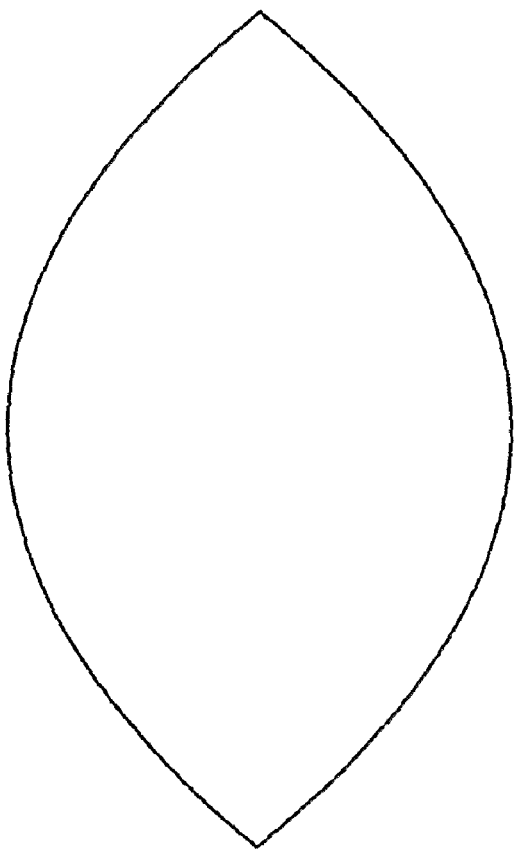
FIG. 4 shows a lozenge element which may be included in some embodiments of sets of tessellating element according to the invention.

FIG. 4 shows a tessellating element of the type previously referred to herein as a "lozenge" element; this includes two curved sides each of radius of curvature x. The element of FIG. 4 may be abutted to the curved surfaces of corner elements such as those shown in FIG. 1.

Figure 5A:
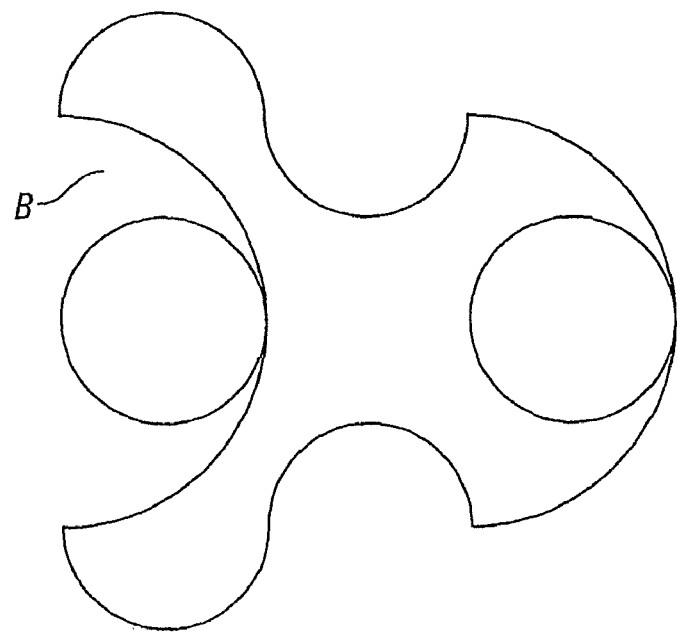
FIGS. 5A and 5B show an example of a body-shaped motif (FIG. 5A) and (in exploded view, FIG. 5B) its constituent corners, waves and curves.

FIGS. 5A and B show an array of four semicircular curves S; four corners C and four waves W, all of which can be combined to form a complex tessellating "body-shaped" shape B as shown in FIG. 5A.

Figure 6:
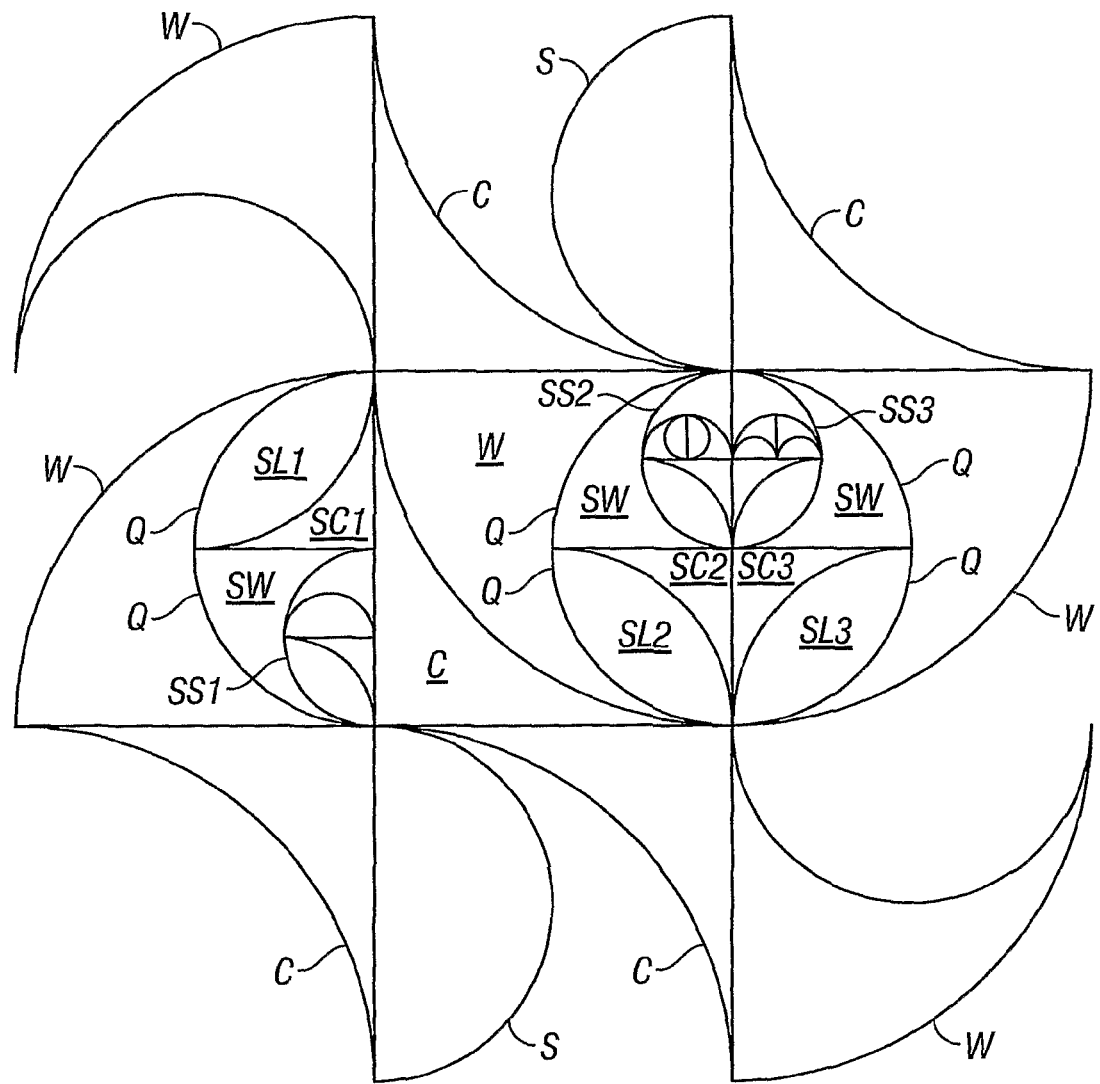
FIG. 6 shows an example of a complex motif which can be built according to the invention using waves, corners, curves and lozenges of different scales.

FIG. 6 shows a complex tessellating shape made of five waves W, five corners C, and five semicircles (or curves) S, three such semicircles S each being subdivided into two respective quadrants Q.

Three of the quadrants Q in the illustrated embodiment are respectively made up of the following combinations:
sub-corner SC1 and sub-lozenge SL1,
sub-corner SC2 and sub-lozenge SL2, and
sub-corner SC3 and sub-lozenge SL3.

The remaining three quadrants are made up of a combination of sub-waves SW and respective sub-semicircles SS1, SS2 and SS3. Sub-semicircles SS1, SS2 and SS3 are divided into sub-quadrants. The sub-quadrants making up sub-semicircle SS1 are further sub-divided into sub-elements of a further higher fractional scale; the sub-quadrants making up the other two sub-semicircles SS2 and SS3 are further subdivided into sub-elements at an even higher fractional scale.

The elements used in the sets according to the invention can produce a whole range of aesthetically pleasing effects; this is believed to be at least in part due to the balance of the relative surface areas, which are:
Curve $\pi x^2/8$
Wave $\pi x^2/8$
Corner $(1+\pi)x^2/4$
Lozenge $(\pi-3)x^2/4$

The invention claimed is:

1. A set of articles of manufacture, wherein each member of the set is a tessellating element and the members of the set in combination provide a tessellated surface, wherein the tessellating elements comprise
   (a) at least one element of a first type having at least one shaped face with a perimeter which comprises a semi-circle having a straight side forming the diameter of said semi-circle, said straight side having a length x;
   (b) at least one element of a second type having at least one shaped face with a perimeter which is three-sided, including a first side which is straight and of length x, a second side which comprises a concave curve foaming a semi-circle of diameter x, and a third side which is a convex curve foaming a quarter circle of radius x;
   (c) at least one element of a third type having at least one shaped face with a perimeter which is three-sided, including two straight sides of length x at right angles to one another and a third side which is a concave curve forming a quadrant of radius x.

2. A set according to claim 1, which further includes
   (d) at least one tessellating element of a fourth type having at least one shaped face with a perimeter comprising two arcuate edges, each said arcuate edge having a radius of curvature x.

3. A set according to claim 1, wherein the elements have a depth and the shaped faces of each of the elements is an undersurface.

4. A set according to claim 1, wherein the elements are substantially planar and have a visible surface.

5. A set according to claim 1, wherein the element of the second type has two faces with said three-sided perimeter, said two faces being substantially congruent to one another.

6. A set according to claim 1, wherein the element of the third type has two said faces with said three-sided perimeter, said two faces being substantially congruent to one another.

7. A set according to claim 1, which also includes
   (e) at least one further tessellating element of a fifth type having a having at least one shaped face with a perimeter which comprises a semi-circle of diameter 2y times x, wherein y is a whole number;
   (f) at least one further tessellating element of a sixth type having at least one shaped face substantially identical in shape to corresponding faces of said elements of a second type, which element of a sixth type has a straight side of length 2y times x, wherein y is a whole number; and
   (g) at least one further tessellating element of a seventh type having at least one shaped face with a perimeter which is substantially identical in shape to corresponding faces of said elements of a third type, which element of a seventh type has two straight sides of length 2y times x, wherein y is a whole number.

8. A set according to claim 7, which further comprises
   (h) at least one further tessellating element of an eighth type having at least one shaped face with a perimeter which is substantially identical in shape to said elements of a fourth type, which elements of a eighth type have two arcuate sides of radius of curvature substantially 2y times x, wherein y is a whole number.

9. The set of articles in accordance with claim 1 wherein the tessellating elements have a planar perimeter.

10. The set of articles in accordance with claim 1, wherein the tessellating elements have perimeters that conform to the surface of a three dimensional curved body.

11. The set of articles according to claim 10, wherein at least some of the tessellating elements have an open interior.

12. A tessellating arrangement which comprises a plurality of sets of articles according to claim 1, in which the tessellating elements are laid with straight edges of said elements abutting straight edges of further ones of said elements, with convex curved sides of elements of the first type abutting concave sides of selected elements of the second type, with convex curved sides of elements of the second type abutting concave curved sides of selected elements of the third type.

13. A method of applying space-filling shapes to a surface, which comprises
    providing a plurality of sets of articles according to claim 1, and laying articles selected from said sets individually or in groups on the surface, in such a manner that
        straight sides of the first type, straight sides of selected elements of the second type, and straight sides of selected elements of the third type are in respective abutment with one another, and
        convex sides of selected elements of the first type abut concave sides of selected elements of the second type, and
        convex curved sides of selected elements of the second type abut concave curved sides of selected elements of the third type, and
    applying the shapes to the surface to provide a space-filling tessellation pattern on the surface.

14. A method according to claim 13, which further comprises providing a plurality of further sets of articles of manufacture, wherein each member of each further set is a further tessellating element, wherein the further tessellating elements comprise
    at least one further tessellating element of a fifth type having a having at least one shaped face with a perimeter which comprises a semi-circle having a straight side forming the diameter of said semi-circle, said straight side having a length 2y times x, wherein y is a whole number;
    at least one further tessellating element of a sixth type having at least one shaped face substantially identical in shape to corresponding faces of said elements of a second type, which element of a sixth type has a straight side of length 2y times x, wherein y is a whole number; and
    at least one further tessellating element of a seventh type having at least one shaped face with a perimeter which is substantially identical in shape to corresponding faces of said elements of a third type, which element of a seventh type has two straight sides of length 2y times x, wherein y is a whole number, and
    laying elements selected from said sets individually or as groups on said surface with straight edges of said elements abutting straight edges of further ones of said elements and straight sides of selected elements of the first type, with convex sides of selected elements of a fifth type abutting concave sides of selected elements of a sixth type; with convex curved sides of selected elements of a sixth type abutting concave curved sides of selected elements of a seventh type.

15. An article of manufacture having a set of tessellating elements disposed on a surface thereof, said set of tessellating elements comprising
    (a) at least one element of a first type having at least one shaped face with a perimeter which comprises a semi-circle having a straight side forming the diameter of said semi-circle, said straight side having a length of x;
    (b) at least one element of a second type having at least one shaped face with a perimeter which is three-sided, including a first side which is straight and of length x, a second side which comprises a concave curve forming a semi-circle of diameter x, and a third side which is a convex curve forming a quarter circle of radius x;
    (c) at least one element of a third type having at least one shaped face with a perimeter which is three-sided, including two sides of length x at right angles to one another and a third side which is a concave curve forming a quadrant of radius x.

16. The article of claim 15, wherein the article is a screen, and the tessellating elements are displayed as an image on the screen.

17. The article of claim 15, which further includes
    (d) at least one tessellating element of a fourth type having at least one shaped face with a perimeter comprising two arcuate edges, each said arcuate edge having a radius of curvature x.

* * * * *

UNITED STATES PATENT AND TRADEMARK OFFICE
CERTIFICATE OF CORRECTION

Page 1 of 1

PATENT NO. : 7,955,680 B2
APPLICATION NO. : 12/377353
DATED : June 7, 2011
INVENTOR(S) : D'Ambrosio et al.

Figure 5B:
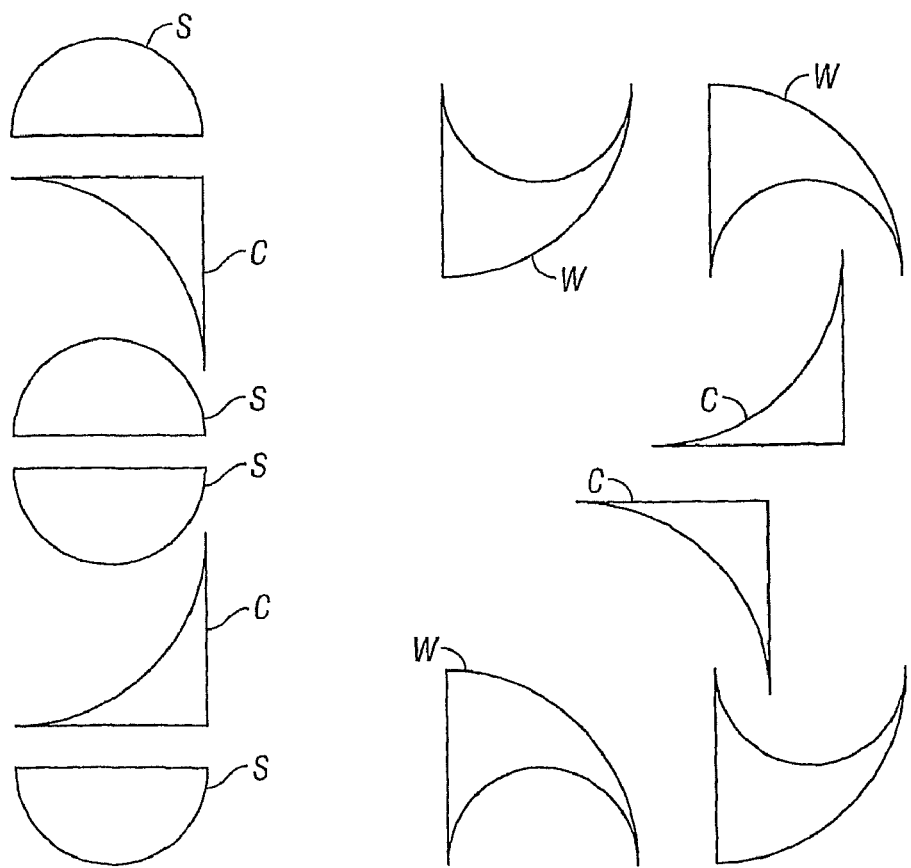

It is certified that error appears in the above-identified patent and that said Letters Patent is hereby corrected as shown below:

In the specification:

Column 7, Lines 47 - 50 should read: -- FIGS. 5A and B show an array of four semicircular curves S; four corners C and four waves W (shown exploded in Fig. 5B), all of which can be combined to form a complex tessellating "body-shaped" shape B as shown in Fig. 5A. --

In the claims:

Column 8, Claim 1, Lines 19 - 24 should read: -- (b) at least one element of a second type having at least one shaped face with a perimeter which is three-sided, including a first side which is straight and of length x, a second side which comprises a concave curve forming a semi-circle of diameter x, and a third side which is a convex curve forming a quarter circle of radius x; --

Column 8, Claim 7, Lines 47 - 50 should read: -- (e) at least one further tessellating element of a fifth type having at least one shaped face with a perimeter which comprises a semi-circle of diameter 2y times x, wherein y is a whole number; --

Column 9, Claim 14, Lines 42 - 47 should read: -- at least one further tessellating element of a fifth type having at least one shaped face with a perimeter which comprises a semi-circle having a straight side forming the diameter of said semi-circle, said straight side having a length 2y times x, wherein y is a whole number; --

Signed and Sealed this
Sixteenth Day of August, 2011

David J. Kappos
*Director of the United States Patent and Trademark Office*